United States Patent [19]
Mueller-Fiedler et al.

[11] Patent Number: 5,841,912
[45] Date of Patent: Nov. 24, 1998

[54] OPTICAL SWITCHING DEVICE

[75] Inventors: Roland Mueller-Fiedler; Gottfried Flik, both of Leonberg; Hagen Schmidt, Leipzig, all of Germany

[73] Assignee: Robert Bosch GmbH, Stuttgart, Germany

[21] Appl. No.: 804,940

[22] Filed: Feb. 24, 1997

[30] Foreign Application Priority Data

Apr. 27, 1996 [DE] Germany ................. 196 16 934.8

[51] Int. Cl.$^6$ ............................................. G02F 1/335
[52] U.S. Cl. ................................ 385/7; 385/16; 385/40
[58] Field of Search ............................ 385/7–10, 14, 385/2, 16, 18, 22–24, 37, 50

[56] References Cited

U.S. PATENT DOCUMENTS

| | | | |
|---|---|---|---|
| 5,446,807 | 8/1995 | Baran et al. | 385/7 |
| 5,542,009 | 7/1996 | Kuehnle | 385/7 |
| 5,586,206 | 12/1996 | Brinkman et al. | 385/8 |

FOREIGN PATENT DOCUMENTS 61-113034  5/1986  Japan ......................... 385/7

OTHER PUBLICATIONS

Hunsperger, R. "Integrated Optics: Theory and Technology" 1985.

Electronics Letters Jul. 16, 1987/5GHz–Spaced 8– Channel . . . , vol. 23 No. 15, pp. 788–789.

*Primary Examiner*—Hemang Sanghavi
*Attorney, Agent, or Firm*—Michael J. Striker

[57] ABSTRACT

The optical switching device includes an optical layer (5) provided with at least one optical waveguide (11) having an entrance (13) and an outlet (15) and at least one other optical waveguide (21) provided in the optical layer (5) with another outlet (23); a piezoelectric layer (7) arranged on the optical layer (5); electrodes (9) for producing an acoustic wave provided on the piezoelectric layer (7); and a device for performing a Bragg light deflection with optical frequency shift by one of activating and deactivating the electrodes to optically couple the entrance (13) of the at least one optical waveguide (11) with one or the other of the outlets (15, 23). The invention also relates to an optical by-pass circuit which is a combination of two optical switching devices.

14 Claims, 3 Drawing Sheets

OPTICAL SWITCHING DEVICE

BACKGROUND OF THE INVENTION

The invention relates to an optical switching device comprising a first optical layer in which at least one optical waveguide having an entrance and an outlet is formed and a second piezoelectric layer associated with the first optical layer and electrodes for production of an acoustic wave provided on the second piezoelectric layer.

This type of acoustic-optic switching device is known in the prior art. For example, so-called "bulk-Bragg cells" are frequently used in optics in order to cause a deflection in free beam technology or to cause a frequency shift of the light wave in an acousto-optical modulator. Integrated optical Bragg cells are known from the use of piezoelectric crystalline materials, such as Lithium niobate ($LiNbO_3$) as an integrated optical waveguide (R. G. Hunsberger: "Integrated optics: Theory and Technology", Springer-Verlag, Heidelberg, 1985; M. S. Wu: "Low-Loss ZnO Optical Waveguides for SAW-AO Applications", IEEE Transactions on Ultrasonics, Ferroelectrics and Frequency Control, Vol. 36, No. 4, 442(1989)).

Moreover an optical switch in a silicon substrate in the form of an interferometer is known. Thus, for example, in the article, "5 Ghz-spaced, Eight-channel, Guided-wave Tunable Multi/demultiplexer for Optical FDM Transmission Systems", Electronic Letters 23, No. 15,788(1987) an integrated optical waveguide made from silicon dioxide doped with titanium is disclosed, which forms a Mach-Zehnder Interferometer, whose one arm can be heated with the help of a thin layer resistance. A phase shift between both partial waves can result from a definite temperature increase, which leads to an optical coupling in one of two outlet waveguides according to choice during guiding in an integrated-optical directional coupler. Inorganic light-guiding materials, such as silicon dioxide, have only a comparatively small thermo-optic coefficient so that the switching function is connected with comparatively high heat input.

The known optical switch, especially the above-mentioned bulk-Bragg cells, have the disadvantage that they are very large and are not useable in the vicinity of integrated-optical components. Moreover no switching between two spatially separated outlets during which an optical frequency shift can be performed at the same time may be accomplished with other optical switches known from the state of the art. The necessity for this exists, e.g., in heterodyne interferometery.

SUMMARY OF THE INVENTION

It is an object of the present invention to provide an improved optical switching device of the above-described type which is not only useful to switch a light beam on and off, but also to switch a light beam from one outlet to another.

These objects, and others which will be made more apparent hereinafter, are attained in an optical switching device comprising an optical layer in which at least one optical waveguide having an entrance and an outlet is formed, a piezoelectric layer associated with the optical layer and electrodes for producing an acoustic wave provided on the piezoelectric layer.

According to the invention, the optical switching device includes at least one other optical waveguide having an outlet provided in the optical layer and means for performing a Bragg light deflection with optical frequency shift by one of activating and deactivating the electrodes to optically couple the entrance of the at least one optical waveguide with one of the outlet of the at least one optical waveguide and the outlet of the at least one other optical waveguide.

The optical switching device according to the invention has the advantage that it is a compact structural component which not only can be used to switch on and off a light beam, but also to shift it from one outlet to another with a frequency shift at the same time.

Because of that, an optical waveguide cooperates with another optical waveguide in an optical layer, so that a light wave is deflected into the other optical waveguide in the vicinity of an acoustic wave produced by means of a piezoelectric layer. Thus a switching from one output to the other may be accomplished by a simple activation and deactivation of the acoustic wave. Particularly a compact structure using only two layers is sufficient to accomplish this.

Electrodes for producing the acoustic waves advantageously are provided on the opposite side of the piezoelectric layer from the optical layer. Understandably an electrode arrangement on the other side is also conceivable.

Embodiments in which the electrodes are arranged on both sides of the piezoelectric layer or, alternatively, one on one side and one on the other provide the advantage that, on the one hand, redundancies and operating reliability are increased, while, on the other hand, an electrode arrangement acting as a detector results, which detects whether the other electrode arrangement is activated or deactivated.

The use of an optical beam spreader, e.g. in the form of a Horn-Taper structure, or lens structures, at the entrance of the one optical waveguide, is particularly advantageous in order to improve and intensify deflection by the acoustic wave, whereby the spread light beam is concentrated or focused again to its normal size by a suitable light beam focusing device.

The layers may be applied to a common substrate with the help of thin layer technology so that a very compact structure resulted. Advantageously silicon may be used as the substrate material so that a compatible process for semiconductor manufacture is possible which allows an additional monolithic integration of electronic functions. Moreover the micromechanical structuring of substrate material can be used in order to provide local structure for optical waveguides (glass fibers) and thus in order to guarantee an adjustment-free coupling of optical waveguides in the integrated optical chip.

Advantageously the first optical layer includes doped silicon dioxide layers. The selection of separate layer systems for guidance of the light waves and for excitation of the sound waves advantageously allows the independent optimization of the optical and the piezoelectric properties of the systems.

The invention also comprises an optical by-pass circuit including an optical layer which is provided with at least one optical waveguide having an entrance and an outlet and with at least one other optical waveguide having another entrance and another outlet; a piezoelectric layer arranged on the optical layer; a common substrate made of silicon on which the piezoelectric layer and the optical layer are mounted; electrodes for producing an acoustic wave, each of which are provided on one side or the other of the piezoelectric layer; means for detecting the acoustic wave including at least one of the electrodes to generate a suitable detection signal and means for performing a Bragg light deflection with optical frequency shift by one of activating and deactivating the electrodes to optically couple one of the entrance of the at least one optical waveguide and the entrance of the at least one other optical waveguide with one of the outlets. The at least one optical waveguide crosses the at least one other optical waveguide at an angle which corresponds to a Bragg deflection angle and the optical layer includes a number of doped silicon dioxide layers.

The optical by-pass circuit according to the invention has the advantage that it is possible in a simple manner using the optical switching device according to the invention to provide a switching matrix with two entrances and two outlets. Thus coupling devices may be provided in some embodiments by which several optical entrances may be coupled according to choice with one of several optical outlets, whereby a fixed predetermined coupling between an entrance and an outlet exists in a deactivated state coupling device. Thus the switching device shifts into a stable state independently of other parameters during interference.

In an advantageous way an optical fiber is associated with one entrance and an optical fiber is associated with its corresponding outlet, while a light source is arranged at another entrance and a light detector, at another outlet. A signal processing device cooperating with the light source and the light detector is by-passed by an optical coupling between both optical fibers in the deactivated state. Interference with this device does not lead to an interruption of the transmission from one optical fiber to another.

Additional advantageous embodiments are described further in the appended dependent claims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
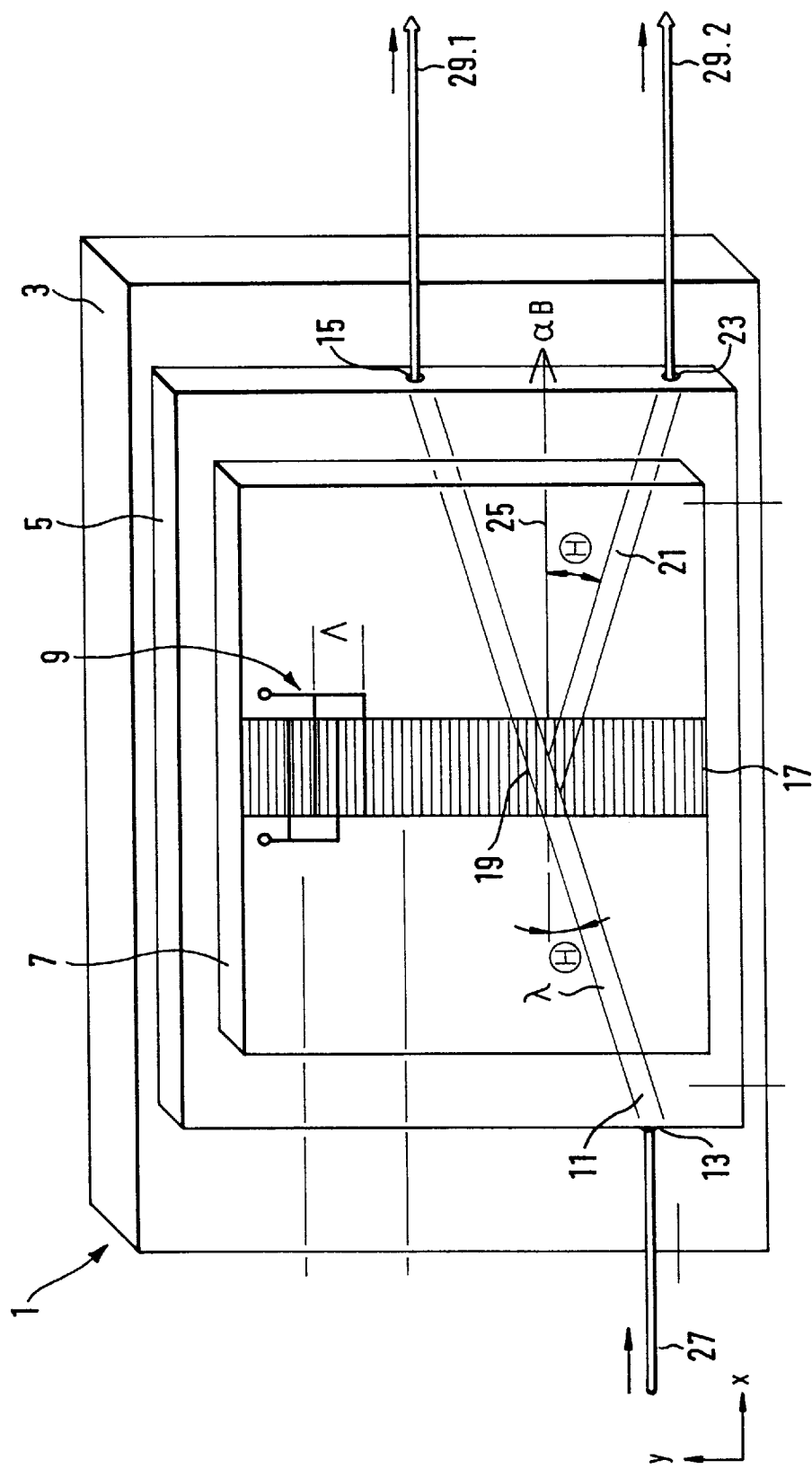
FIG. 1 is a schematic perspective view of one embodiment of an optical switching device according to the invention.

An optical switching device 1 is schematically illustrated in FIG. 1 and has a substrate layer 3, advantageously made of silicon, to which an optical layer 5 is applied. Particularly the known standard thin layer technology is suitable for the application process. The figure does not show that the optical layer 5 is formed as a layer system. The optical layer 5 is advantageously formed from a plurality of differently doped silicon dioxide layers, which guarantee vertical light guidance because of their different refractive indices. Lateral light guide means can also be provided in a simple way by a suitable lateral structuring of the layer system, which, e.g., can be attained by plasma etching.

A piezoelectric layer 7 is arranged on this light guiding optical layer 5. It can be made, for example, by sputtering of zinc oxide or aluminum nitride. Understandably a plurality of other material systems and layer technologies can also be used, such as deposition of lead-zirconate-titanate layers in a sol-gel process.

Besides the arrangement of the piezoelectric layer 7 on the optical layer 5 understandably also this layer may be arranged under the optical layer 5.

An electrode arrangement 9 in the form of an interdigital converter is provided on the piezoelectric layer 7. An acoustic surface wave, which propagates in the Y-direction in FIG. 1, may be excited in the piezoelectric layer 7 by coupling of a high frequency in the electrode arrangement. Both a Rayleigh-mode and also modes of higher order (Sezawa-mode) can be used here as acoustic waves. These acoustic surface waves spread in the optical layer 5 and lead there to periodic index of refraction changes. The period corresponds to the wavelength of the sound wave. The index of refraction change results, because of a periodic spatial oscillation of a dynamic optical grid in which the light waves are deflected. As a result of the large lateral spreading of the sound wave, the grid may be represented by a Bragg grid, so that the angular deflection corresponds to twice the Bragg angle $2\Theta_B$, wherein $\Theta_B$ is given by:

$$2 \cdot \Lambda \cdot \sin \Theta_B = \lambda.$$

Here $\Lambda$ is the acoustic wavelength and $\lambda$ is the optical wavelength of a light source in the optical layer 5, which is connected with the wavelength $\lambda_0$ in vacuo with $$\lambda = \lambda_0/n_{\text{eff}}.$$

A Bragg angle $\Theta_B$ of about 1.5° results with the usual light wavelengths of $\lambda_0 \cong 1.3$ to $1.5 \, \mu m$ and acoustic surface waves with $\Lambda \cong 20 \, \mu m$ when a silicon dioxide layer is used as the optical material with a refractive index of about 1.5.

This effect is used in the circuit device shown in FIG. 1 for switching from one outlet to the other. A light waveguide or optical waveguide 11 is also provided in the optical layer 5, which connects an entrance 13 optically with an outlet 15. This optical waveguide 11 is arranged at an angle of $\Theta$ relative to the schematically illustrated wave front 17.

An additional optical waveguide 21 is provided extending from this first optical waveguide 11 in a surface wave region 19, which opens into a second outlet 23. Also this optical waveguide is arrange at an angle of $\Theta$ relative to the wave front line 25.

An optical fiber 27 is coupled to the entrance 13 for input of the light beam, while optical fibers 29.1 and 29.2 are associated with the outlets 15 and 23. The light beam input into the optical waveguide 11 is guided directly to the output 15 with the electrode arrangement deactivated, which means in the absence of a surface wave.

When the electrode arrangement is activated the above-mentioned surface wave forms, which leads, as described above, to a deflection of the light beam about $2\Theta$. Thus an input light wave is deflected in the vicinity 19 about this angle and thus guided by means of the suitable arrangement of the light wave guide 21 to the output 23. Thus a switching between both outlets 15 and 23 is possible by activation and deactivation of the electrode arrangements.

Figure 2:
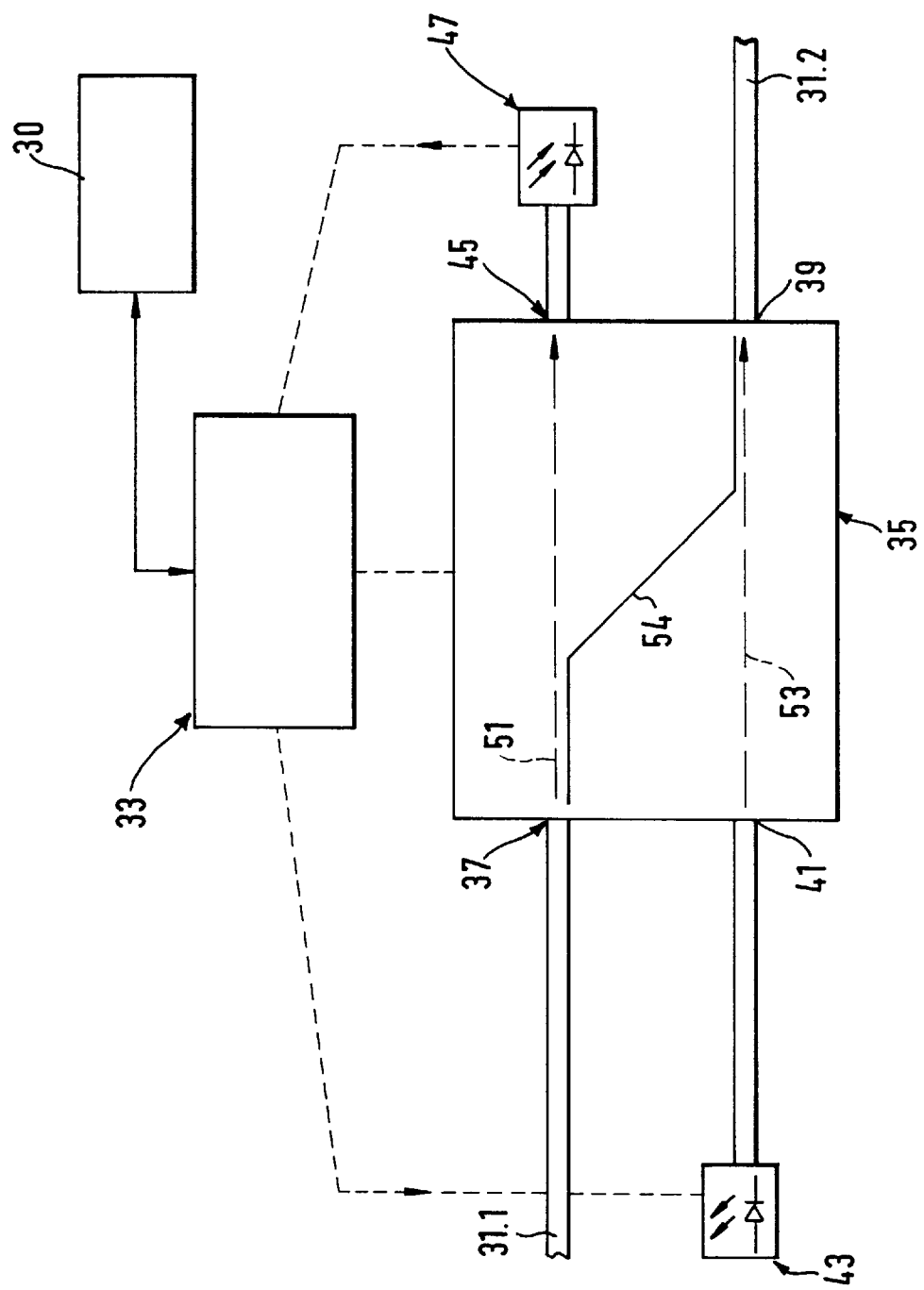
FIG. 2 is a block diagram showing an application of an optical switching device according to the invention.

FIG. 2 shows an example of an application of the optical switching device according to the invention, which is a component of a participating node of an optical communication network, e.g. a local network. In one such network several participating stations are connected by a fixed data bus with each other. This data bus is an optical fiber in an optical network.

In FIG. 2 one sees that a participating station 30 is connected with another downstream unshown participating station by an optical fiber 31.1 and with an additional upstream unshown participating station by an optical fiber 31.2. A signal processing device 33 is provided as an interface between the participating station 30 and the optical data bus 31. This signal processing device 33 controls an optical switching device 35, whose first entrance 37 is associated with the optical fiber 31.1 and whose first outlet 39 is associated with the optical fiber 31.2.

FIG. 2 however shows that the optical switching device 35 has a second entrance 41, which is associated with a light source 43, for example a laser diode. The optical switching device 35 has a second outlet 45 available which is associated with a light detector 47. Both the transmitting device 43 and also the detector 47 are connected with the signal processing device 33.

The participating node thus operates in the standard case so that the data coming over the optical fiber 31.1 are conducted to the detector 47 as shown by a dashed optical connection 51 in the optical switching device 35. The corresponding electronically converted data then reach the signal processing device 33, which filters out the information designed for the participating station 30 from the data stream, and newly added information and the data stream modified in this way is transmitted by the transmitting device 43 and over the optical connection 53 formed in the optical switching device 35 to the optical fiber 31.2 so that the data then reaches the downstream participating station.

This data transmission from the upstream to the downstream participating station depends on the operational effectiveness of the signal processing device 33. In case this fails because of a voltage interruption, the network is paralyzed, since the incoming data cannot reach the optical fiber 31.2.

In order to guarantee a friction-less operation of a network, an optical switching device is made by combination of two optical switching devices according to FIG. 1, which guarantees the two-dimensional connections 51,53 in the activated state. In the deactivated state, which for example occurs during a voltage drop, the optical switching device 35 is however switched so that a connection 54 is made between a first input 37 and a first outlet 39. Thus the data stream can flow to the downstream participating station avoiding the participating station 30 and the signal processing apparatus 33.

Figure 3:
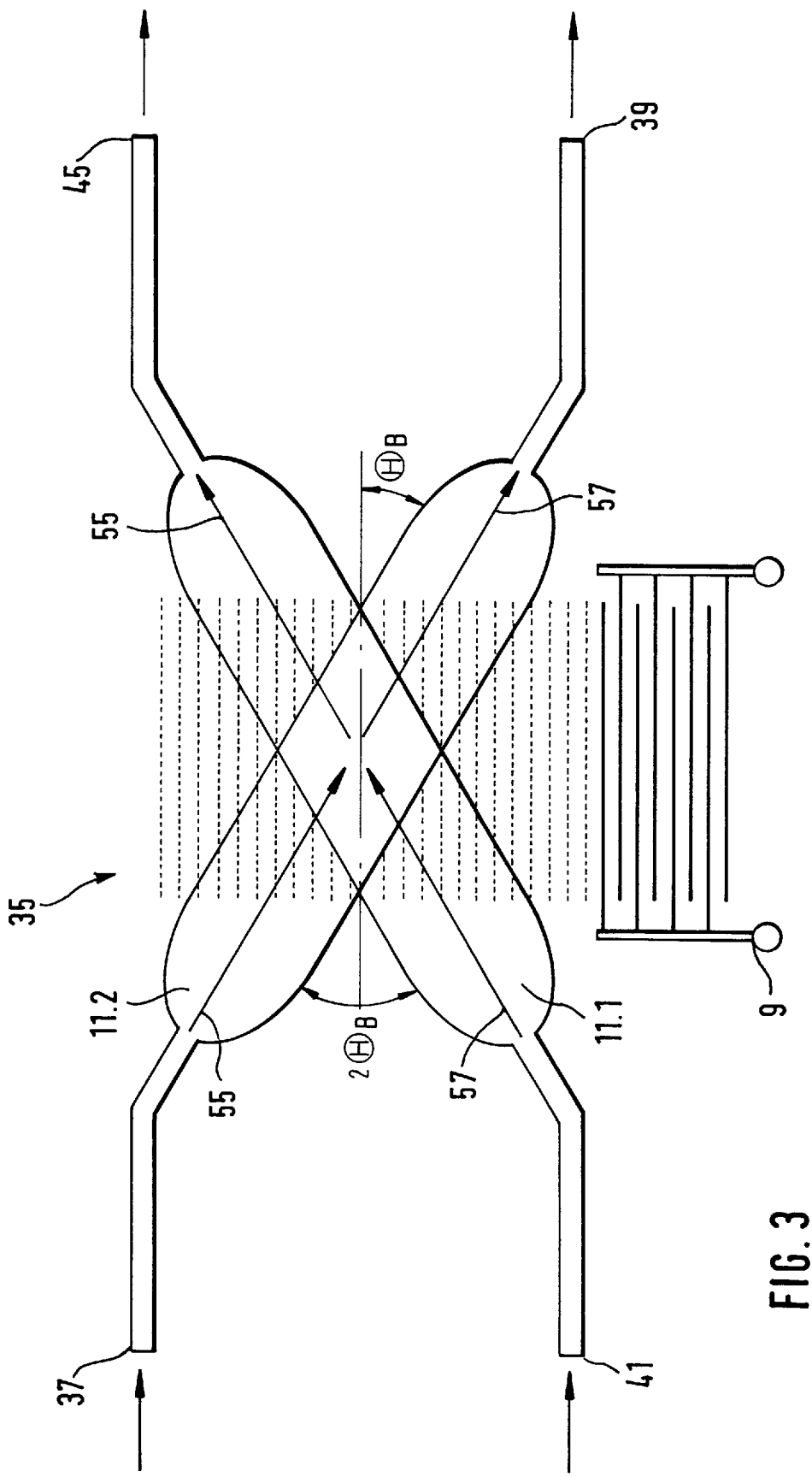
FIG. 3 is a schematic diagram of an optical by-pass circuit according to the invention.

The exact structure of this optical switching device is shown diagrammatically in FIG. 3. This optical switching device has substantially the same layers, as the optical switching device according to FIG. 1. A more detailed illustration is therefore not necessary.

The embodiment shown in FIG. 3 differs from the optical switching device shown in FIG. 1, because of the presence of the additional optical waveguide 11.2 in the optical layer besides the optical waveguide 11.1. This optical waveguide 11.2 has an entrance 37 and an outlet 39 and it is superimposed on the optical waveguide 21 (FIG. 1) in the lower region. To guarantee the desired operation it is necessary that both optical waveguides 11.1 and 11.2 cross each other. The angle between these waveguides 11.1 and 11.2 is a Bragg-deflection angle of $2\Theta_B$.

On activation of an electrode arrangement, which means an acoustic surface wave is present, a light beam 55 is deflected in the Bragg grid about an angle $2\Theta_B$ and is conducted to outlet 45 by means of the corresponding optical waveguide. Thus an optical connection is made between the entrance 37 and the outlet 45.

A light beam 57 is deflected about the same angle so that it is guided to the outlet 39 over the optical waveguide 21(11.2), as in the embodiment according to FIG. 1. Consequently an optical connection between the entrance 41 and the outlet 39 is obtained.

Soon the electrode arrangement 9 is deactivated, which results in the absence of the acoustic surface waves necessary for bending, so that the light waves or light beams travel to the outlets diagonally across from the entrances. That means that the entrance 37, for example, is optically connected with the outlet 39.

Thus an optical by-pass circuit is formed in a simple way by combination of two optical switching device shown in FIG. 1.

FIG. 3 allows for detection so that the optical wave must be spread out with the acoustic surface waves in the region acting to cause the deflection, so that they extend laterally over several grid periods in order to guarantee a high deflection coefficient. An arrangement is provided in which the beam spreading is caused by a "so-called" Horn-Taper structure. The light beam or wave is reduced again in its lateral extent to its original width by inverse structuring at the outlet side of the optical waveguide crossing point.

The disclosure in German Patent Application 196 16 934.8 of Apr. 27, 1996 is incorporated here by reference. This German Patent Application also discloses the invention described above and claimed in the claims appended hereinbelow and forms the basis for a claim of priority for the instant invention based on 35 U.S.C. 119.

While the invention has been illustrated and described as embodied in a optical switching device, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An optical switching device comprising an optical layer (5) provided with at least one optical waveguide (11) having an entrance (13) and an outlet (15) and at least one other optical waveguide (21) provided in the optical layer (5) with another outlet (23); a piezoelectric layer (7) arranged on the optical layer (5); electrodes (9) for producing an acoustic wave provided on the piezoelectric layer (7); and means for performing a Bragg light deflection with optical frequency shift by one of activating and deactivating said electrodes to optically couple the entrance (13) of the at least one optical waveguide (11) with one of said outlet (15) of the at least one optical waveguide (11) and said another outlet (23) of the at least one other optical waveguide (21).

2. The optical switching device as defined in claim 1, wherein the electrodes (9) are arranged on a side of the piezoelectric layer (7) opposite from said optical layer (5).

3. The optical switching device as defined in claim 1, wherein the electrodes (9) are arranged on a side of the piezoelectric layer (7) adjacent to said optical layer (5).

4. The optical switching device as defined in claim 1, wherein the electrodes (9) are arranged on both sides of the piezoelectric layer (7), and further comprising means for detecting the acoustic wave comprising at least one of the electrodes to generate a detection signal.

5. The optical switching device as defined in claim 1, wherein the electrodes (9) are arranged on one side of the piezoelectric layer (7), and further comprising means for detecting the acoustic wave comprising at least one of the electrodes to generate a detection signal.

6. The optical switching device as defined in claim 1, wherein the electrodes (9) form an interdigital converter.

7. The optical switching device as defined in claim 1, further comprising a beam spreading device arranged at said entrance (13) of the at least one optical waveguide (11) and a beam focusing device arranged at an outlet (15) of the at least one optical waveguide.

8. The optical switching device as defined in claim 7, wherein the beam spreading device has a Horn-Taper structure and the beam focusing device has an inverse structure.

9. The optical switching device as defined in claim 1, further comprising a common substrate (3) on which said piezoelectric layer (7) and said optical layer (5) are applied by thin layer technology.

10. The optical switching device as defined in claim 9, wherein said substrate is made of silicon.

11. The optical switching device as defined in claim 1, wherein the optical layer comprises a plurality of doped silicon dioxide layers.

12. The optical switching device comprising an optical layer (5) provided with at least one optical waveguide (11.1) having an entrance (41) and an outlet (45) and with at least one other optical waveguide (11.2) having another entrance (37) and another outlet (39), said at least one optical waveguide (11.1) crossing said at least one other optical waveguide (11.2) at an angle which corresponds to a Bragg deflection angle and said optical layer (5) comprising a plurality of doped silicon dioxide layers; a piezoelectric layer (7) arranged on the optical layer (5); a common substrate (3) made of silicon on which said piezoelectric layer (7) and said optical layer (5) are mounted; a plurality of electrodes (9) for producing an acoustic wave, each of said electrodes being provided on a side of said piezoelectric layer (7); means for detecting the acoustic wave comprising at least one of the electrodes to generate a suitable detection signal and means for performing a Bragg light deflection with optical frequency shift by one of activating and deactivating said electrodes (9) to optically couple one of the entrances (37,41) of the at least one optical waveguide and the at least one other optical waveguide with one of said outlets (39,45).

13. The optical switching device as defined in claim 12, further comprising an optical fiber arranged at each of said entrances and said outlets, a light source (43) at the entrance of said at least one other optical waveguide (11.2) and a light detector (47) arranged at an outlet (45) of the at least one other optical waveguide (11.2), so that an optical connection between both of said optical fibers exists when said electrodes (9) are not activated.

14. The optical switching device as defined in claim 13, wherein twice said Bragg deflection angle amounts to 3° when a refractive index of said optical waveguide amounts to 1.5 $\mu$m, the light source produces light having a wavelength in the vicinity of 1.3 $\mu$m to 1.5 $\mu$m and the acoustic wave has a wavelength of about 20 $\mu$m.

* * * * *